Figure 1:
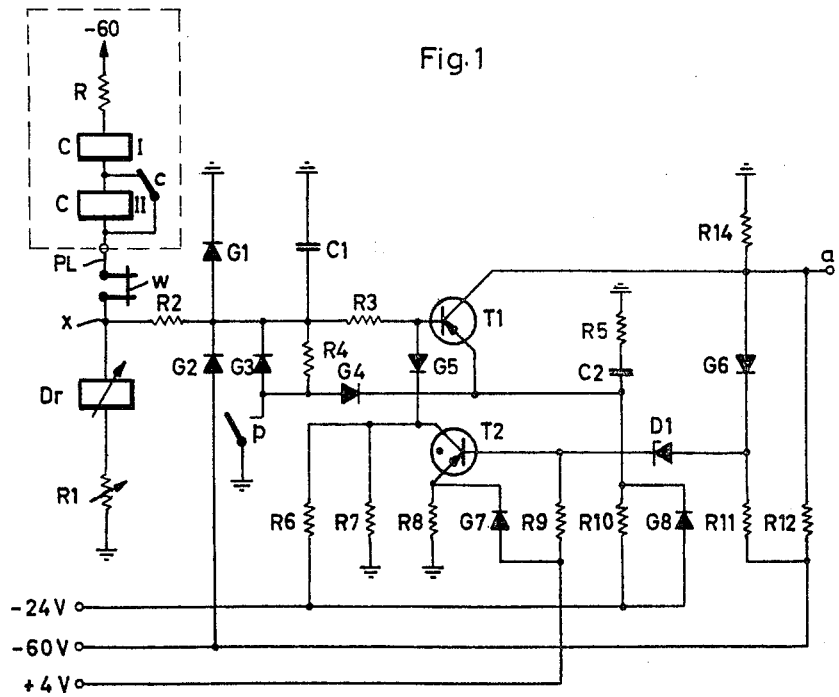

United States Patent Office 3,287,502
Patented Nov. 22, 1966

3,287,502
VOLTAGE-VARIATION-RATE BUSY TEST
Josef Röhrig, Munich, Germany, assignor to Siemens & Halske Aktiengesellschaft, Berlin and Munich, Germany, a corporation of Germany
Filed July 1, 1963, Ser. No. 293,230
Claims priority, application Germany, July 4, 1962, S 80,238
2 Claims. (Cl. 179—18)

The invention disclosed herein relates to a circuit arrangement for testing communication lines and is particularly concerned with a circuit arrangement for telephone systems wherein lines to be tested are switched through to a test circuit including a test line equivalence branch forming with the respective test line a complex resistance, and wherein the ratio of the equivalence branch and the operationally effective part of the test line indicates the operating condition of the respective test line as to the idle or busy condition thereof.

Problems having to do with the testing method are encountered in connection with known testing circuits, for example, in connection with circuit arrangements wherein the idle condition of test lines is indicated by a first voltage potential while the busy condition is indicated by a second voltage potential, and wherein test lines involved in connections which are in the process of being released may for a given time interval carry the first noted potential which corresponds to the idle condition, despite the fact that the idle condition is not yet attained because the release operations are not yet completed. In such circuits, upon testing on the one hand, idle test lines and on the other hand, test lines involved in connections which are in the process of being released and thus about to become idle, the respective alteration of the voltage drop at resistances of the testing means is of different magnitude owing to different complex resistances of the test lines.

A test delay was provided in known circuits so as to enable differentiation between idle test lines and test lines involved in connections which are in the process of being released, whereby the start of each testing operation is delayed to the end of a respective given time interval during which there is danger of double testing. However, such a test delay is disadvantageous in connection with test circuits in centrally disposed switching devices.

There has also been proposed a test circuit arrangement for checking purposes, whereby test lines which are involved in connections in the process of releasing, which test lines are about to become idle, can be distinguished from idle test lines which are not involved in release operations. Definite instants for the start and the end of the test operations are thereby determined by means of delay members, the testing being effected by operatively connecting voltage to the respective connection device, during the time interval which is delimited by these instants, whereby this interval falls within the voltage rise which extends dynamically over resistances contained in the test line. Moreover, there is provided a voltage threshold value which is within the indicated interval exceeded by the voltage at the test circuit means, incident to the testing of an idle test line, while not being exceeded incident to the testing of a test line involved in a connection which is in the process of being released. Accordingly, the busy condition of a test line is made apparent by the facultative exceeding of the voltage threshold value with utilization of the characteristic of the voltage course within the interval of the dynamic current rise taking place incident to the testing of test lines involved in connections in the process of being released.

It is advantageous to make the testing operation independent of the delay members in order to shorten the testing operation, for example, in connection with central switching devices.

The present invention proposes another solution for the problems involved, which is thereby characterized that the busy condition of test lines is made apparent by the steepness of the voltage alteration resulting upon closure of test current circuits, corresponding to the respective operating condition, by voltage at test circuit means which differentiate as to time. The invention makes it particularly possible, in connection with circuit arrangements in which the idle condition and the busy condition prevailing on test lines are respectively indicated by a first and a second potential, and wherein test lines involved in connections in the process of releasing and about to become idle, may possibly carry the first potential which corresponds to the idle condition, to recognize the effective idle condition of test lines by the magnitude of the voltage potential thereof, at test circuit means which operates to ascertain the first voltage potential and the alternation of the voltage potential due to differentiation of the voltage as to time.

The advantage of the invention resides in that an operatively useful test result can be obtained by evaluation of the steepness of the current increase in the circuits, already before the end of the current increase.

A further particular advantage of the invention resides in the possibility of distinguishing test lines which merely are in the process of becoming idle and therefore can not be seized for the extension of connections, but the test voltage of which is upon closure of a test circuit for a given time interval equal to that of effectively idle and seizable test lines, from the latter already during the current increase in the test circuit, whereby the testing operation can be considerably shortened.

Still another considerable advantage of the invention resides in that test circuits of this kind are very insensitive to interference by supply voltages, for example, 50 cycles from public networks or 16⅔ cycles from railway supply networks, since the steepness of the curves of the interference voltages is relatively much lower than that of the current increase occurring in the respective testing operations.

Further details and features of the invention will appear from the appended claims and from the description of an example of an embodiment thereof which is rendered below with reference to the accompanying drawing.

Figure 2:
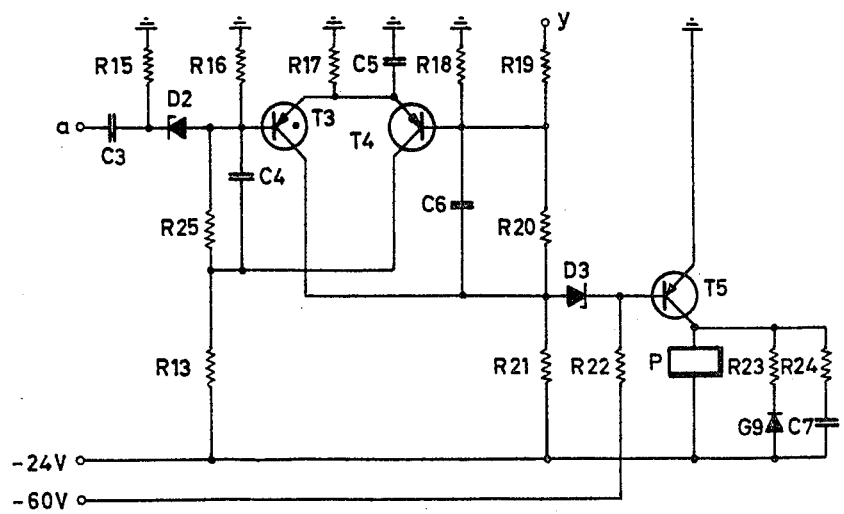

In the drawing,

FIGS. 1 and 2 taken together and joined at the terminals $a$, show a circuit arrangement according to the invention, including only those components which are required for an understanding thereof.

Referring now to the drawing, relay C, having windings I and II, and the resistor R, connected therewith in series relationship, represent the seizure circuit to which the test circuit shown in FIGS. 1 and 2 can be connected by way of the test line PL, by means of a selector switch W which may be, for example, a rotary switch or a relay coupler and the like.

The relay C, disposed in this seizure circuit, is deenergized when the test line PL which extends thereto, is idle, that is, when such test line can be seized. The winding II of relay C is in this condition short-circuited by contact $c$.

However, in the case of busy condition, the relay C is in a circuit extending by way of the test line PL, a selector W, test resistors and the like, connected with a potential signifying busy condition, for example, with ground potential, and therefore is operatively energized, contact $c$ being open and its winding II which is normally short-circuited, is included in the respective circuit.

The circuit is incident to the release operation interrupted, for example, at the selector W, but relay C is not yet restored to normal and its winding II is accordingly not yet short-circuited, the energization of relay C decaying in this condition. Owing to the absence of the short circuit, the inductive resistance of relay C is at such instant higher than it is in idle condition. The relay is in such condition of partial energization quicker fully energized upon reconnecting the test circuit thereto, than it would be upon seizure of the test line after restoration thereof and consequent short-circuiting of its winding II by the contact c.

Upon closure of a test circuit by way of the switch W, there is formed, as already proposed, a voltage divider comprising a resistor R, the relay C, the coke Dr and the resistor R1. The choke Dr and the resistor R1 are, with consideration of the electrical value of the resistor R and the relay C, so dimensioned and possibly adjusted, that upon switching through of the test circuit in the presence of a restored seizure relay C, a substantially constant potential will appear at the testing point $x$ during a current increase in the test circuit. The increase of the potential at the testing point $x$ is effected, with a relatively great steepness.

However, in the event that such a test circuit is connected to a test line (and seizure circuit) which is in the process of being released, the negative voltage at the testing point $x$ increases with considerably lesser steepness owing to the relatively much greater inductive resistance of the relay C as compared with the inductive resistance of the choke Dr; however, due to the fact that the relay C is already pre-energized while the choke Dr is not pre-energized and is moreover attenuated (since it is to simulate a restored seizure relay C), the negative voltage at the testing point $x$ will momentarily increase to a value higher than the terminal value which is determined by the values of the direct current resistances of the seizure relay C and the testing choke Dr, since the terminal value of the energization is at the non-attenuated and pre-energized seizure relay quicker attained than in the case of the attenuated choke Dr. This terminal value lies below the lowest negative voltage potential which is still considered as a potential signifying idle condition. The voltage to which the potential at the testing point momentarily increases, is higher and lies in the range of the potential indicating idle condition, but is not evaluated as such owing to consideration of the steepness of the voltage increase.

In the resting or normal condition of the circuit, that is, when the point or terminal $x$ of the test circuit is not connected to an idle test line PL, there are various voltage divider partial circuits effective in the test circuit, namely:

(1)
$$+4 \frac{T2}{R9}, \frac{G7, \frac{R8}{R7}, \text{ground}}{\frac{R6, -24}{D1, R11, -60}}$$

(2) ground, R1, Dr, $(x)$, R2, R4, G4, R10, —24;
(3) ground, (R18, R20)/(R17, T3), R21, —24;
(4) ground, R16, R25, R13, —24;
(5) ground, R14, R12, —60.

Upon closure of a test circuit for an idle test line PL (in which the relay C is deenergized, that is, restored to normal), for example, by way of selector switch W, there will be initially established a voltage divider circuit:

(6) ground, R1, Dr, $(x)$, W, PL, c, CI, R, —60

There will appear a voltage potential at the testing point $x$ which remains substantially constant during the current increase in the test circuit since the test choke Dr has substantially the same electrical properties as the seizure relay C. This voltage potential, proceeding from the ground potential, has a relatively great steepness; it is to be evaluated as a potential indicating idle condition (hereinafter conveniently referred to as idle potential) and becomes operatively effective with respect to the transistor T1. The curve of the voltage increase is somewhat flattened by the action of the capacitor C1 so as to eliminate the effect of interference voltage peaks which may occur, for example, due to clicking noises or the like, and to reduce the steepness to a definite value which however still remains relatively great. The idle potential which becomes effective at the transistor T1 increases, for example, by 24 volts. The circuit (2) thereby becomes ineffective since the rectifier G4 now operates in blocking direction. However, the transistor T1 becomes conductive, resulting in the following circuit:

(7)
$$-24, G8, T1, \frac{R14, \text{ground},}{\frac{R12,}{G6, R11}}, -60$$

There appears in this circuit between the diode D1 and the rectifier G6 a partial voltage potential which is lower than the potential appearing at the same point in the circuit (1), whereby the Zener voltage of the diode is reduced so that current flow ceases in this branch of the circuit (1). Accordingly, the base voltage of the transistor T2 increases up to +4 volts and such transistor is thereby placed on cutoff; that is, the circuit (1) is reduced to the following circuit:

(8)  ground, R7, R6, —24

The partial voltage at the point $a$ which before was determined by the circuit (5), is reduced after the formation of the circuit (7), corresponding to the further negative voltage increase at the test point $x$ (for example, by 1 volt) beyond the value at which the transistor becomes conductive, such reduction becoming effective within a definite relatively small voltage range which is hereinafter referred to as test voltage range. The steepness of the voltage reduction at the point $a$ corresponds to the steepness of the voltage increase at the test point $x$ within the indicated test voltage range. The voltage reduction at the point $a$ effects by way of the capacitor C3 transmission to the flip-flop circuit shown in FIG. 2, of a definite current impulse the amplitude of which is determined by the steepness of the voltage reduction, such impulse operatively affecting the flip-flop circuit as will be presently described. The capacitor acts thereby in a differentiating sense. The voltage at the test point $x$ increases beyond the indicated test voltage range which however remains without effect so far as the flip-flop circuit is concerned.

Upon testing a test line involved in a connection which is in the process of being released and is about to become idle, the steepness of the negative voltage increase at the test point $x$ will be considerably smaller, owing to the differentiating action of the capacitor C3 and the current impulse transmitted to the flip-flop circuit, FIG. 2, will accordingly be likewise considerably smaller and, as will be presently explained more in detail, will have no effect on the flip-flop circuit.

The terminal $y$ is in the normal or resting condition of the circuit by way of suitable, not illustrated circuit means, on ground potential, whereby the transistor T3 is made conductive upon initiation of the testing operation prior to the switching-through of the test circuit (see circuit (3)). The diode D2 acts in blocking sense between ground potential (by way of resistor R15) and a partial voltage potential determined by the circuit (3). Upon connecting the test circuit to a test line PL which is about to become idle, the current impulse transmitted by way of the capacitor C3 effects a voltage drop acting likewise as an impulse on the resistor R15. Depending upon the magnitude of this voltage drop, which is added to the voltage lying in the resting condition on the diode D3 and acting thereon in blocking sense, the Zener voltage of the diode D3 is or is not exceeded. This impulse affects the flip-flop circuit correspondingly, such circuit comprising inter alia the transistors T3, T4, therefore also effecting the relay P by way of transistor T5.

Upon connecting the test circuit by way of the test point $x$ to a test line of a connection which is being released, such test line being in the process of becoming idle, the steepness of the voltage increase at the test point $x$ and the steepness of the voltage reduction at the point $a$, will be slight. The impulse transmitted by way of the capacitor C3 will accordingly be so weak that the Zener voltage of the diode is not exceeded, the impulse therefore remaining without effect and relay P remaining at rest.

However, upon connecting the test circuit to an idle test line, the steepness of the voltage increase at the test point $x$ as well as the voltage decrease at the point $a$, and therewith the amplitude of the impulse transmitted by way of capacitor C3, will be so great as to exceed the Zener voltage owing to the voltage drop occurring during the impulse at the resistor R15. The voltage at the base of the transistor T3 becomes more positive during the interval when the Zener voltage is exceeded, thereby making the circuit (3) ineffective and reducing it to the circuit:

(9)     ground, R18, R20, R21

The voltage on the base of the transistor T4 is in the circuit (9) more negative than in the circuit (3), so that the transistor T4 becomes conductive, resulting in the following circuit:

(10) ground, (R17, T4/(R16, R25), R13, —24

The transistor T3 is placed on cutoff by the partial voltage dropping at the resistor R16. A negative partial voltage appears at the diode D3 whereby the Zener voltage is exceeded. This partial voltage becomes effective with respect to the transistor T5, which had been at cutoff by the effect of the +4 volts potential, making such transistor conductive. Relay P is operatively energized in the following circuit:

(11)     ground, T5, P, —24

Upon operatively energizing, relay P actuates its contact $p$, thereby completing the following circuit:

(12)

$$\text{ground, } p, \frac{\overline{\dfrac{R7}{G4, T1, G5, R6, -24}}}{\overline{\dfrac{G3, R2, (x), W, PL, c, CI, R, -60}{R1, Dr}}}$$

The test line is thereby marked as being busy. The partial voltage potential appearing on the rectifier G3 and the resistor R2, acts in the test line as a busy potential. The transistor T1 remains conductive since there is by way of the rectifier G4 ground potential on its emitter while negative partial voltage potential is connected to its base, such partial potential being derived at the resistor R7, in the circuit (12).

Upon testing a test line in a circuit extending through a cable, the capacitance of the cable will affect the testing operation, such capacitance acting in the manner of a capacitor connected in parallel to the seizure circuit (seizure relay C and resistor R).

Upon connecting a test circuit through a cable to an idle and therefore seizable test line, the voltage at the test point $x$ will initially increase to a higher point than would be the case in the absence of the cable. After a relatively short time, the voltage at the test point drops to a value corresponding to testing without the use of a cable. When the voltage passes at the test point $x$ the test voltage range, the flip-flop circuit will become effective with respect to the relay P. Upon dropping of the voltage at the test point $x$ to the value corresponding to testing without a cable, whereby the indicated test voltage range is not passed, the flip-flop circuit will accordingly be effective with respect to the relay P, such relay energizing and connecting busy potential to the test line by actuating its contact $p$.

Upon connecting a test circuit through a cable to a test line involved in a connection in the process of releasing, which test line is about to become idle, the voltage at the test point $x$ will likewise initially increase to a point beyond the test voltage range. Upon passing this range, the flip-flop circuit will likewise become effective with respect to relay P and the latter will be initially energized. The voltage at the test point $x$ drops to a value corresponding to testing without a cable, of a test line which is about to become idle, thereby passing the test voltage range. The voltage course within the test voltage range exhibits a relatively great negative steepness. Relay P has not yet energized. The circuit (1) becomes effective again.

The voltage at the point $a$ increases again to the value corresponding to the resting condition. The steepness of the voltage increase at the point $a$ corresponds to the steepness of the voltage decrease at the point $x$ within the test voltage range.

This increase of the voltage at the point $a$ causes transmission of a current impulse to the flip-flop circuit shown in FIG. 2, the amplitude of such impulse being determined by the steepness of the voltage increase. These operations of the differentiating by the capacitor C3 correspond to the operations already described and differ therefrom merely by the current direction or polarity, respectively. The transistor T3 becomes conductive again by the action on its base of the negative impulse corresponding to the voltage increase at the point $a$. The circuit (3) becomes operative again, making the base of the transistor T4 more positive and thus placing it at cutoff. The circuits (10) and (11) become inffective and the relay P is accordingly deenergized. The voltage at the test point $x$ increases again and passes the test voltage range. Relay P is thereby not operatively energized again owing to the insufficient steepness of the voltage increase at the test point $x$ as already described before.

The operatively effective energization time interval of the relay P is preferably greater than the previously described energization time which is insufficient to effect its operative energization.

In the event that this requirement is not satisfied and relay P energizes after decay of the test voltage and passage through the test voltage range in falling direction, owing to its momentary energization and its electromechanical inertia, the transistor T1, which was meanwhile placed at cutoff, can not become conductive again despite the closure of contact $p$, since a more negative voltage is at the emitter of the transistor T1 than at its base [see circuit (12)], which is accomplished by appropriate dimensioning of the rectifiers G3 and G4. The test circuit, particularly the transistor T1, is by the closure of the contact $p$ not operationally triggered but merely operationally maintained. As already proposed by another circuit arrangement, this measure also reduces considerably the danger interval during which double testing may occur.

The indicated magnitudes of voltage values are intended to serve merely explanatory purposes and have no basic bearing on the invention. The invention is not inherently limited to the described and illustrated embodiment. It may be realized by the use of differently constructed circuits comprising different components, for example, relays, electron tubes and the like.

Changes may accordingly be made within the scope and spirit of the appended claims which define what is believed to be new and desired to have protected by Letters Patent.

I claim:

1. A circuit arrangement for communication systems, especially telephone systems, wherein test lines are for testing purposes connected with testing means to form test circuits therewith, the respective test circuit comprising a complex resistance including the involved test line and a test line equivalence branch, wherein the ratio of resistance of said branch to the resistance of the respective test line indicates the operating condition of the latter as to the idle or busy condition thereof, said test circuit further comprising time-differentiating test circuit means, whereby the operating condition of a test line which is being tested is indicated by the voltage appearing at the differentiating test means in accordance with the steepness of voltage variation resulting at the test circuit according to the prevailing operating condition of the respective test line.

2. A circuit arrangement according to claim 1, wherein the idle condition of a test line is marked by a first voltage potential while the busy condition thereof is marked by a second voltage potential, wherein a test line which is unavailable for extending a connection owing to being involved in a connection which is in the process of being released, may possibly carry the first noted potential, operationally idle test lines and test lines involved in connections about to be released producing upon the testing thereof an alteration of the voltage drop at resistances of the test circuit, which alteration is of different steepness owing to different complex resistances of the respective test lines, whereby the idle condition of test lines is indicated by said time-differentiating test circuit means upon testing the respective test lines as to the magnitude of the voltage potential thereon so as to ascertain the first voltage potential and thereafter the variation of the voltage potential owing to differentiation of the voltage as to time.

No references cited.

KATHLEEN H. CLAFFY, *Primary Examiner.*

WILLIAM C. COOPER, *Examiner.*